United States Patent
Liu et al.

(10) Patent No.: US 11,914,379 B2
(45) Date of Patent: Feb. 27, 2024

(54) METHODS AND APPARATUS TO GENERATE A PATH PLAN

(71) Applicant: Deere & Company, Moline, IL (US)

(72) Inventors: Qiang R. Liu, Urbandale, IA (US); Jeffery J. Adams, Ankeny, IA (US); Ryan C. Burnley, Ankeny, IA (US); Andrej Cygankov, Clive, IA (US)

(73) Assignee: Deere & Company, Moline, IL (US)

( * ) Notice: Subject to any disclaimer, the term of this patent is extended or adjusted under 35 U.S.C. 154(b) by 45 days.

(21) Appl. No.: 17/133,045

(22) Filed: Dec. 23, 2020

(65) Prior Publication Data

US 2022/0197291 A1     Jun. 23, 2022

(51) Int. Cl.
G05D 1/02     (2020.01)
G05D 1/00     (2006.01)
G01C 21/34    (2006.01)

(52) U.S. Cl.
CPC ....... G05D 1/0214 (2013.01); G01C 21/3453 (2013.01); G05D 2201/0201 (2013.01)

(58) Field of Classification Search
CPC ......... G05D 1/0214; G05D 2201/0201; G05D 1/0217; G05D 1/0278; G05D 2201/0213; G01C 21/3453; G01C 21/3658; G01C 21/34; B62D 15/025; A01B 79/005; A01B 69/008; A01B 69/007; A01B 79/007; A01B 69/00
See application file for complete search history.

(56) References Cited

U.S. PATENT DOCUMENTS

| | | |
|---|---|---|
| 4,788,645 A | 11/1988 | Zavoli |
| 5,661,650 A | 8/1997 | Sekine |
| 5,928,309 A | 7/1999 | Korver |
| 6,141,617 A | 10/2000 | Matsuda |
| 6,907,336 B2 | 6/2005 | Gray |
| 6,934,615 B2 | 8/2005 | Flann |
| 7,010,425 B2 | 3/2006 | Gray |

(Continued)

FOREIGN PATENT DOCUMENTS

| | | | | |
|---|---|---|---|---|
| CA | 3038768 A1 | * | 4/2018 | ........... A01B 69/007 |
| CN | 102167038 A | * | 8/2011 | |

(Continued)

OTHER PUBLICATIONS

Machine Translation: DE-102004045724-A1 (Year: 2006).*

(Continued)

*Primary Examiner* — Anne Marie Antonucci
*Assistant Examiner* — Connor L Knight
(74) *Attorney, Agent, or Firm* — Hanley, Flight & Zimmerman, LLC

(57) ABSTRACT

Methods, apparatus, systems and articles of manufacture are disclosed to generate a path plan. An example method includes generating guidance lines for a next path of a vehicle based on an edge of a current path, generating a first path plan of a field within a field boundary, the first path plan generated using a first degree heading, generating a second path plan of the field within the field boundary, the second path plan generated using a second degree heading, and when the first path plan includes a first cost lower than a second cost of the second path plan, transmitting the first path plan to a vehicle to control the vehicle.

20 Claims, 9 Drawing Sheets

(56) References Cited

U.S. PATENT DOCUMENTS

| | | |
|---|---|---|
| 7,077,232 B2 | 7/2006 | Correia |
| 7,079,943 B2 | 7/2006 | Flann |
| 7,110,881 B2 | 9/2006 | Gray |
| 7,216,033 B2 | 5/2007 | Flann |
| 7,228,214 B2 | 6/2007 | Flann |
| 7,522,091 B2 | 4/2009 | Cong |
| 7,689,356 B2* | 3/2010 | Dix .................. A01B 69/008 |
| | | 701/425 |
| 8,209,075 B2 | 6/2012 | Senneff |
| 8,359,139 B2 | 1/2013 | Wang |
| 8,725,361 B2 | 5/2014 | Kellum |
| 8,897,960 B2 | 11/2014 | Sekine |
| 8,924,099 B2 | 12/2014 | Nelson, Jr. |
| 9,020,757 B2 | 4/2015 | Peake |
| 9,746,854 B2 | 8/2017 | Berkemeier |
| 10,039,231 B2 | 8/2018 | Anderson |
| 10,095,237 B2 | 10/2018 | Li |
| 10,139,826 B2 | 11/2018 | Berkemeier |
| 10,143,126 B2 | 12/2018 | Foster |
| 10,194,575 B2 | 2/2019 | Schmidt |
| 10,386,844 B2 | 8/2019 | Wilcox |
| 10,645,858 B2 | 5/2020 | Lawson |
| 11,112,262 B2 | 9/2021 | Anderson |
| 11,178,805 B2 | 11/2021 | Robinson |
| 11,224,154 B2 | 1/2022 | Dix |
| 2004/0193349 A1* | 9/2004 | Flann ................ G05D 1/0274 |
| | | 701/50 |
| 2006/0142936 A1 | 6/2006 | Dix |
| 2008/0249686 A1 | 10/2008 | Mikuriya |
| 2009/0106990 A1 | 4/2009 | Harrill |
| 2011/0118938 A1 | 5/2011 | Macdonald |
| 2013/0304300 A1 | 11/2013 | Peake |
| 2014/0244114 A1 | 8/2014 | Matsubara |
| 2014/0253722 A1 | 9/2014 | Smyth |
| 2014/0277954 A1 | 9/2014 | Nelson, Jr. |
| 2016/0313735 A1 | 10/2016 | Berkemeier |
| 2016/0313737 A1 | 10/2016 | Berkemeier |
| 2017/0300064 A1* | 10/2017 | Wolters ............... G05D 1/0219 |
| 2017/0354079 A1* | 12/2017 | Foster ................. G05D 1/0276 |
| 2017/0355398 A1 | 12/2017 | Dix |
| 2018/0002882 A1 | 1/2018 | Stromsoe |
| 2018/0088590 A1 | 3/2018 | Zhu |
| 2018/0359905 A1* | 12/2018 | Foster ................. A01B 69/008 |
| 2019/0208695 A1* | 7/2019 | Graf Plessen ....... A01B 69/007 |
| 2019/0289769 A1 | 9/2019 | Antich |
| 2019/0317508 A1* | 10/2019 | Zhang ................... G08G 1/167 |
| 2019/0343035 A1 | 11/2019 | Smith |
| 2019/0375450 A1 | 12/2019 | Medagoda et al. |
| 2020/0352082 A1 | 11/2020 | Maeder |
| 2021/0000004 A1 | 1/2021 | Robinson |
| 2021/0000005 A1 | 1/2021 | Robinson |
| 2021/0026362 A1* | 1/2021 | Wilson .................. B60Q 9/008 |
| 2021/0267115 A1* | 9/2021 | Fjelstad ............... G05D 1/0257 |
| 2022/0039309 A1 | 2/2022 | Robinson |

FOREIGN PATENT DOCUMENTS

| | | | |
|---|---|---|---|
| CN | 105867377 | 8/2016 | |
| DE | 102004045724 A1 * | 3/2006 | .......... A01B 69/001 |
| EP | 468335 | 1/1992 | |
| EP | 3761065 | 1/2012 | |
| EP | 2984916 A1 | 2/2016 | |
| EP | 3254548 | 12/2017 | |
| EP | 3735811 A1 | 11/2020 | |
| JP | 2019070544 | 5/2019 | |
| KR | 100915121 | 9/2009 | |
| KR | 100925883 | 11/2009 | |
| KR | 2012098270 | 5/2012 | |
| SU | 809076 | 2/1981 | |
| WO | WO2015119265 A1 | 3/2017 | |

OTHER PUBLICATIONS

Machine Translation: CN-102167038-A (Year: 2011).*
Extended European Search Report and Written Opinion issued in European Patent Application No. 21211419.3, dated May 11, 2022, in 06 pages.
European Patent Office, "European Search Report," issued in European Patent Application No. 201820353.4, dated Nov. 16, 2020, 10 pages.
European Patent Office, "European Search Report," issued in European Patent Application No. 20183507.1, dated Nov. 17, 2020, 10 pages.
European Patent Office, "Intent to Grant," issued in European Patent Application No. 201820353.4, dated Aug. 8, 2022, 8 pages.
European Patent Office, "Intent to Grant," issued in European Patent Application No. 20183507.1 dated Aug. 23, 2022, 8 pages.
United States Patent and Trademark Office, "Notice of Allowance and Fee(s) Due," issued in connection with U.S. Appl. No. 16/504,020, dated Jul. 22, 2021, 5 pages.
United States Patent and Trademark Office, "Final Office Action," issued in connection with U.S. Appl. No. 16/906,853, dated Nov. 21, 2022, 50 pages.
United States Patent and Trademark Office, "Non-Final Office Action," issued in connection with U.S. Appl. No. 16/906,853, dated Jun. 20, 2022, 46 pages.
United States Patent and Trademark Office, "Advisory Action," issued in connection with U.S. Appl. No. 16/906,853, dated Jan. 31, 2023, 3 pages.
United States Patent and Trademark Office, "Non-Final Office Action," issued in connection with U.S. Appl. No. 16/504,020 dated Mar. 17, 2021, 5 pages.
United States Patent and Trademark Office, "Non-Final Office Action," issued in connection with U.S. Appl. No. 17/508,793 dated Jan. 4, 2023, 6 pages.

* cited by examiner

METHODS AND APPARATUS TO GENERATE A PATH PLAN

FIELD OF THE DISCLOSURE

This disclosure relates generally to vehicle guidance, and, more particularly, to methods and apparatus to generate a path plan.

BACKGROUND

In recent years, agricultural vehicles have become increasingly automated. Agricultural vehicles may semi-autonomously or fully-autonomously drive and perform operations on fields. Agricultural vehicles perform operations using, for example, planting implements, spraying implements, harvesting implements, fertilizing implements, strip/till implements, etc. These autonomous agricultural vehicles include multiple sensors (e.g., Global Navigation Satellite System (GNSS), Global Positioning Systems (GPS), Light Detection and Ranging (LIDAR), Radio Detection and Ranging (RADAR), Sound Navigation and Ranging (SONAR), telematics sensors, etc.) to help navigate without the assistance, or with limited assistance, from human users.

Figure 1:
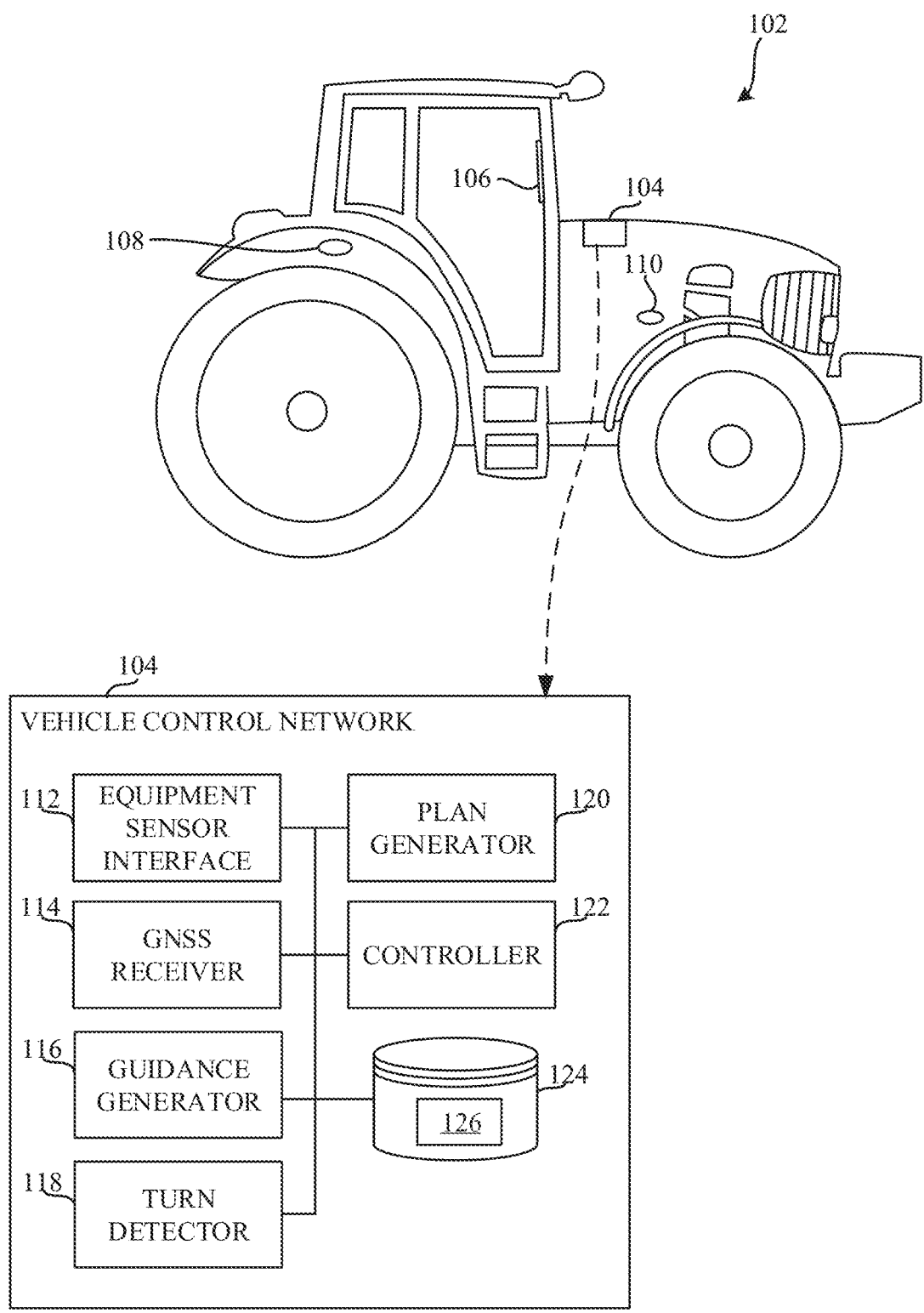
FIG. 1 is a schematic illustration of an example vehicle and an example vehicle control network to generate a path plan to guide the vehicle.

The figures are not to scale. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Automation of agricultural vehicles is highly commercially desirable, because automation can improve the accuracy with which operations are performed, reduce operator fatigue, improve efficiency, and accrue other benefits. Automated vehicles move by following guidance lines and/or paths. Conventional methods to follow a previously generated path include using feedback control systems that rely on control parameters, and/or controller gains, to control a system. For example, such control parameters include proportional controllers, integral controllers, and derivative (PID) controllers. A controller may have many different modes of operation including an acquisition mode of operation and a tracking mode of operation. As used herein, "tracking," "tracking mode," "tracking mode of operation," and/or their derivatives refer to following and/or tracking a guidance line. As used herein, "acquisition," "acquisition mode," "acquisition mode of operation," and/or their derivatives refer to getting to the guidance line, the path, and/or acquiring a position that is substantially similar to (e.g., within one meter of, within a half meter of, within two meters of, etc.) the guidance line.

Conventional methods for generating a path include selecting a point (e.g., point "A") to be a starting point for the path. In conventional methods, a heading for the automated vehicle is selected to generate a path from point "A" in the direction of the heading. In conventional methods, a point (e.g., point "B") is selected based on the heading to define a straight line for the path (e.g., from point "A" to point "B"). In other conventional methods, a path is generated for automated vehicles based on a prior report. In such approaches, the prior report may be generated responsive to a user of a vehicle indicating to record the coverage path. As used herein, a coverage path refers to a path traveled by a vehicle and/or implement in which a portion of a field has been tended to. In such approaches, the prior report includes coverage information corresponding to a trip taken by the vehicle and/or implement. Such an approach requires an operator of the vehicle to initiate a recording of the coverage path taken by the vehicle. As such, operation of a vehicle can be cumbersome due to the operator having to manually initiate tracking of the coverage path. In the event such an operator is unable to or forgets to initiate tracking of a coverage path, path generation on a subsequent trip may be inaccurate or unsuccessful.

Additionally, such an approach to generate a path (e.g., guidance lines for a vehicle to follow) is traditionally dependent on a report that identifies if an operator of a vehicle has a different implement coupled to the vehicle. For example, a prior report including historical coverage data may correspond to a vehicle with a first implement (e.g., a sprayer). Thus, such a prior report may be an inapplicable record of coverage data for the same vehicle with a second implement (e.g., a planter or any suitable implement different than the first implement) because the first implement may have a different working width than the second implement. In such approaches, generating a path for the second implement using coverage data (e.g., a prior report) from the coverage path of the first implement may result in a path plan that does not fully cover a field. As used herein, a path plan is an outline of a path for the vehicle to follow in a field, where the path is generated based on the coverage path determined from the coverage data.

Examples disclosed herein facilitate the generation of a path plan based on coverage data obtained during operation (e.g., coverage data obtained in substantially real time, real time etc.). Examples disclosed herein may obtain substantially real time coverage data corresponding to the current trip and generate a path plan and/or otherwise coverage path based on such coverage data.

Examples disclosed herein facilitate the generation of a path plan independent of the implement and/or working width of the vehicle. For example, because examples disclosed herein include generating a path plan based on recently obtained coverage data, examples disclosed herein can generate a path plan based on a field boundary obtained in substantially real time.

Examples disclosed herein include determining whether a user of a vehicle has finished traversing a boundary of a working field (e.g., a field boundary). In this manner, examples disclosed herein include determining whether any turns within the field boundary include a turn radius less than a radius threshold. As used herein, a radius threshold is the minimum radius the system (e.g., the vehicle and implement) can follow. Examples disclosed herein include adjusting a coverage path for the particular and/or otherwise corresponding turn that includes a turn radius less than a radius threshold.

Examples disclosed herein include selecting an initial degree heading for an example coverage path within the field boundary. With this, examples disclosed herein include generating a series of coverage paths that form a path plan. Examples disclosed herein may generate an alternate and/or otherwise different path plan based on a different degree heading. Examples disclosed herein further include generating a cost for a path plan once generated. In this manner, examples disclosed herein include selecting the path plan with the lowest cost.

FIG. 1 is a schematic illustration of an example vehicle 102 and an example vehicle control network 104 to generate a path plan to guide the vehicle 102. The vehicle 102 includes the vehicle control network 104, an example user display 106, an example first sensor 108, and an example second sensor 110. The vehicle control network 104 includes an example equipment sensor interface 112, an example GNSS receiver 114, an example guidance generator 116, an example turn detector 118, an example plan generator 120, an example controller 122, and an example data store 124.

In the example illustrated in FIG. 1, the vehicle 102 is an agriculture vehicle (e.g., a tractor, front loader, harvester, cultivator, or any other suitable vehicle) configured to acquire and/or track a path. For example, the vehicle 102 may be a tractor capable of automatically tracking a row of crops to harvest the row of crops. In FIG. 1, the vehicle 102 is operable in a direction proportional to the direction of the front wheel (e.g., the vehicle 102 is a front steer vehicle). In an additional or alternative example, the vehicle 102 is operable in a direction proportional to the direction of the rear wheel (e.g., the vehicle 102 is a rear steer vehicle). In examples disclosed herein, the vehicle 102 is equipped with the vehicle control network 104 to obtain a path plan including coverage paths to track. The vehicle control network 104 is explained in further detail with respect to the components in the vehicle control network 104. Additionally, an example path plan including coverage paths is described below in connection with FIGS. 3A-3C and FIGS. 4A-4B.

In FIG. 1, the example user display 106 included in the vehicle 102 is an interactive display in which a user may select and/or enter desired inputs (e.g., select a screen display, enter desired vehicle speed, enter aggressiveness variables, select the sampling interval, power on and/or off the vehicle, etc.) before, during, and/or after operation of the vehicle 102. For example, a user may indicate to the vehicle control network 104, via the user display 106, that a path plan is desired (e.g., may indicate to initiate the generation of a path plan). In such an event, the vehicle control network 104 initiates a series of prompts and/or otherwise options for the user to select in generating a path plan. For example, the user display 106 may display a prompt requesting the user to traverse a boundary of a field on which to be operated. In examples disclosed herein, the user display 106 communicates with the vehicle control network 104 to relay and/or receive user inputs, an example path plan 126, etc. In some examples disclosed herein, the user display 106 is a liquid crystal display (LCD) touch screen such as a tablet, a Generation 4 CommandCenter™ Display, a computer monitor, etc.

In the example illustrated in FIG. 1, the first sensor 108 is located near the rear end of the vehicle 102. The first sensor 108 is a velocity sensor that determines the speed and/or direction of the vehicle 102. The first sensor 108 communicates with the vehicle control network 104 to provide data representative of the vehicle's velocity. In other examples disclosed herein, the first sensor 108 may be located in and/or on any suitable section of the vehicle (e.g., the front of the vehicle 102, the roof of the vehicle 102, near the driver side, near the passenger side, etc.). Additionally, in other examples disclosed herein, the first sensor 108 may be any suitable sensor on the vehicle 102 such as a proximity sensor, wheel rotation per minute (RPM) sensor, a LIDAR sensor, etc.

In the example illustrated in FIG. 1, the second sensor 110 is located near the front end of the vehicle 102. The second sensor 110 is a wheel direction sensor that senses the position and/or angle in which a wheel of the vehicle 102 (e.g., a rear wheel and/or a front wheel) is placed. The second sensor 110 communicates with the vehicle control network 104 to provide data representative of the position of a wheel of the vehicle 102. In other examples disclosed herein, the second sensor 110 may be located in and/or on any suitable section of the vehicle (e.g., the front of the vehicle 102, the roof of the vehicle 102, near the driver side, near the passenger side, etc.). Additionally, in other examples disclosed herein, the second sensor 110 may be any suitable sensor on the vehicle 102 such as a proximity sensor, wheel rotation per minute (RPM) sensor, etc.

In FIG. 1, the equipment sensor interface 112 communicates with the first sensor 108 and/or the second sensor 110 to obtain data representative of the velocity of the vehicle 102 and one or more turn angles of one or more of the wheels of the vehicle 102. In examples disclosed herein, the equipment sensor interface 112 communicates with the turn detector 118 to provide the obtained vehicle sensor data. In some examples disclosed herein, the equipment sensor interface 112 may communicate via any suitable wired and/or wireless communication method to obtain vehicle 102 sensor data from, at least, the first sensor 108 and/or the second sensor 110. In some examples disclosed herein, the equipment sensor interface 112 may be an equipment sensor interface controller.

In the example illustrated in FIG. 1, the GNSS receiver 114 is located within the vehicle control network 104. In the example of FIG. 1, the GNSS receiver 114 is a GPS receiver. In other examples disclosed herein, the GNSS receiver 114 may be any suitable geo-spatial positioning receiver. The GNSS receiver 114 communicates with the turn detector 118 to provide and/or otherwise transmit the geographical location of the vehicle 102. More specifically, the GNSS receiver 114 is configured to transmit the geographical position of the GNSS receiver 114 in the vehicle 102. In examples disclosed herein, the GNSS receiver 114 samples the geographical location of the vehicle 102 at a threshold interval. For example, every 0.1 seconds, the GNSS receiver 114 may send the geographical location of the vehicle 102 to the turn detector 118. In some examples, the GNSS receiver 114 receives geographical location data from other vehicles in the field (e.g., vehicles different from the example vehicle 102). For example, the GNSS receiver 114 may connect to a shared network for the field that the vehicle 102 is operating in, and the shared network may obtain coverage data and path data from other machines/vehicles in the network. In examples disclosed herein, the GNSS receiver 114 may communicate with the controller 122 to obtain the path plan 126 in which the vehicle 102 is to travel. In some examples disclosed herein, the GNSS receiver 114 may be a GNSS receiver controller.

In the example illustrated in FIG. 1, the guidance generator 116 generates guidance lines for a current path of the vehicle 102. In examples disclosed herein, the guidance lines are illustrated on either side of the current path and direct the vehicle 102 along the current path. The guidance generator 116 updates the guidance lines as the vehicle follows the current path. In some examples, the guidance generator 116 communicates with the equipment sensor interface 112 and/or the GNSS receiver 114. In the illustrated example, the guidance generator 116 communicates with the equipment sensor interface 112 to obtain data corresponding to a velocity of the vehicle 102, a direction of the vehicle 102, etc. In the illustrated example, the guidance generator 116 communicates with the GNSS receiver 114 to obtain the current geographical location of the vehicle 102. In some examples, the guidance generator 116 communicates with the equipment sensor interface 112 and the GNSS receiver 114 as the user operates the vehicle 102 (e.g., in real time) to obtain data corresponding to a velocity of the vehicle 102, a direction of the vehicle 102, a current geographical location of the vehicle 102, etc. In examples disclosed herein, the guidance generator 116 determines the edge of the current path of the vehicle 102. In some examples, the guidance generator 116 determines the edge of the current path based on the current geographical location of the vehicle 102 and the working width of an implement for the vehicle 102. In the illustrated example, the guidance generator 116 obtains the working width of the vehicle 102 from a user input obtained via the user display 106.

In examples disclosed herein, the guidance generator 116 generates guidance lines for the vehicle 102 on a current path based on the data corresponding to the velocity of the vehicle 102, the direction of the vehicle 102, the current geographical location of the vehicle 102, the edge of the current path, etc. In some examples, the guidance generator 116 determines if geographic location data for other vehicles are available. For example, the guidance generator 116 communicates with the GNSS receiver 114 to receive any geographical location data from other vehicles in the shared coverage network. In some examples, the vehicle 102 may be a follower vehicle to at least one leading vehicle (e.g., a different vehicle in the same field). In some examples, the guidance generator 116 may generate guidance lines for the vehicle 102 based on the geographic location data from other vehicles (e.g., a leading vehicle). In the event the guidance generator 116 receives geographical location data from a leading vehicle from the GNSS receiver 114, the guidance generator 116 determines the edge of the leading vehicle path. In some examples, the guidance generator 116 generates the guidance lines based on the edge of the current path for the vehicle 102 and the edge of the leading vehicle path for other vehicle(s).

In the example illustrated in FIG. 1, the turn detector 118 communicates with the equipment sensor interface 112, the GNSS receiver 114, the plan generator 120, and/or the controller 122. In examples disclosed herein, the turn detector 118 communicates with the equipment sensor interface 112 and/or the GNSS receiver 114 to obtain data corresponding to any of a velocity of the vehicle 102, a direction of the vehicle 102, and/or a geographical position of the vehicle 102. In addition, the turn detector 118 may communicate with the user display 106 to determine whether a user of the vehicle 102 has finished traversing a boundary of the working field (e.g., a field boundary). In this manner, the turn detector 118 can determine whether the field boundary is defined. For example, the turn detector 118 may determine that the field boundary by the vehicle 102 is complete. Further in other examples disclosed herein, the turn detector 118 may utilize any of a velocity of the vehicle 102, a direction of the vehicle 102, and/or a geographical position of the vehicle 102 obtained by the user display 106, the equipment sensor interface 112, and/or the GNSS receiver 114 to determine the field boundary.

In examples disclosed herein, the turn detector 118 is configured to identify and/or otherwise determine the turns of any paths within the field boundary generated by the path plan generator 120 (e.g., headland paths, coverage paths, etc.). For example, in the event the headland path is a square, the turn detector 118 may identify and/or otherwise determine there are four turns. The turn detector 118 determines whether any turns within the headland path include a turn radius less than the radius threshold. For example, a headland path may include four turns and, as such, the turn detector 118 may determine a turn radius of each of the four turns. In this manner, the turn detector 118 compares each turn radius with the radius threshold. In examples disclosed herein, the radius threshold may be a predetermined value such as, for example, a minimum turn radius of the vehicle 102 and/or any coupled implements. In the event the turn detector 118 determines a turn radius of a particular turn does not satisfy the radius threshold, the turn detector 118 indicates to the plan generator 120 that the particular turn includes a turn radius that does not satisfy the radius threshold. In some examples disclosed herein, the turn detector 118 may be a turn detector controller.

In the example of FIG. 1, the plan generator 120 is configured to communicate with the user display 106, the equipment sensor interface 112, the GNSS receiver 114, the turn detector 118, and/or the controller 122. In example disclosed herein, the plan generator 120 may communicate with the user display 106 to determine whether a user of the vehicle 102 has finished traversing a boundary of the working field (e.g., a field boundary). In this manner, the plan generator 120 can determine whether the field boundary is defined. In some examples, the plan generator 120 generates a headland path in response to the field boundary being defined. As used herein, a headland path refers to a path followed by the vehicle 102 and/or implement to define a portion of the field that is left untended to by the vehicle 102 and/or implement. For example, the headland path is determined to be within the field boundary, includes similar features of the field boundary (e.g., same heading, same number of turns, etc.), and is defined to leave an amount of space (e.g., a portion of land) between the field boundary and where the headland path is defined. In examples disclosed herein the plan generator 120 communicates with the turn detector 118 to obtain the an indication corresponding to any number of turns within the headland path that include a turn radius less than a radius threshold. In the event the plan generator 120 obtains an indication of a turn that includes a turn radius less than a radius threshold, the plan generator 120 adjusts the coverage path for the particular and/or otherwise corresponding turn. In one example, the plan generator 120 may, rather than generate a coverage path to substantially follow the headland path, generate a coverage path within the path plan that extends beyond the headland path while remaining within the field boundary so that the vehicle 102 can travel additional space to complete the turn. Additional examples illustrating adjusted coverage paths generated by the plan generator 120 are described below.

Further, the plan generator 120 is configured to select an initial degree heading for an example coverage path within the field boundary. For example, the plan generator 120 may determine an initial degree heading of zero degrees respective to a first direction of travel. Further in such an example, the first direction of travel may refer to a first coverage path to traverse the field within the field boundary. In other examples disclosed herein, a user of the vehicle 102 may indicate, via the user display 106, a desired degree heading.

In this manner, the plan generator 120 is configured to generate a series of coverage paths that make up the path plan 126. Such coverage paths are generated to traverse the field within the field boundary, at the selected degree heading. In examples disclosed herein, the plan generator 120 is configured to generate the path plan 126 based on real time data obtained in substantially real time (e.g., the field boundary). In examples disclosed herein, the plan generator 120 may, responsive to a user input obtained via the user display 106 indicating a working width of the vehicle 102, separate sequential coverage paths by the corresponding working width of the vehicle 102. As a result, the plan generator 120 generates the example path plan 126 including a number of coverage paths that traverse the field within the field boundary at the selected degree heading.

In examples disclosed herein, the plan generator 120 may generate an alternate and/or otherwise different path plan based on a different degree heading. For example, the plan generator 120 may generate a second path plan different from the path plan 126 based on a different degree heading. In some examples, the plan generator 120 may generate a series of path plans each corresponding to a different degree heading. In some examples disclosed herein, the plan generator 120 may increment the degree heading by five degrees and then generate a new path plan based on the new degree heading. For example, the plan generator 120 may generate the path plan 126 for a zero-degree heading, a five degree heading, a ten degree heading, etc. In examples disclosed herein, the plan generator 120 may generate the path plan 126 until the degree heading has been incremented to a threshold degree value (e.g., 180 degrees, 120 degrees, 5 degrees, etc.). In some examples disclosed herein, the plan generator 120 may generate a new path plan for varying increments of a degree heading. For example, the plan generator 120 may increment the initial degree heading by a tenth of a degree and then generate a corresponding path plan until reaching a threshold of five degrees.

In examples disclosed herein, the plan generator 120 generates a corresponding cost of the path plan 126. To calculate the cost of the path plan 126, the plan generator 120 determines a total number of turns in the path plan 126. Additionally, the plan generator 120 determines the length of the turn (e.g., distance covered by the turn). With this, the plan generator 120 calculates the corresponding cost. In some examples disclosed herein, the plan generator 120 may calculate and/or otherwise determine the cost using equation 1 below.

$$\text{Cost} = n*l \qquad \text{Equation 1}$$

In equation 1, the variable n corresponds to the total number of turns (e.g., the total number of paths within the path plan) and the variable l corresponds to the turn length. In examples disclosed herein, the turn length, l, may correspond to the track spacing (e.g., distance between subsequent tracks within the path plan 126) multiplied by a constant (e.g., three), plus an offset value. In examples disclosed herein, the plan generator 120 is configured to store the cost and corresponding path plan 126 in the data store 124. In other examples disclosed herein, the plan generator 120 may be a plan generator controller.

In the example illustrated in FIG. 1, the controller 122 is configured to communicate with the equipment sensor interface 112, the GNSS receiver 114, the turn detector 118, the plan generator 120, and/or the data store 124. In examples disclosed herein, the controller 122 is configured to select a path plan corresponding to the lowest cost. For example, the controller 122 may compare a first cost of a first path plan with a second cost of a second path plan. In such a comparison, the controller 122 may select the path plan with the lower cost. The controller 122 may indicate to the user display 106 to present the selected path plan (e.g., the path plan 126) for use in operating the vehicle 102.

In FIG. 1, the example data store 124 is configured to store path plans (e.g., the path plan 126) and the corresponding cost determined by the plan generator 120. While in the illustrated example the data store 124 is illustrated as a single database, the data store 124 may be implemented by any number and/or type(s) of databases. Furthermore, the data stored at the example data store 124 may be in any data format such as, for example, binary data, comma delimited data, tab delimited data, structured query language (SQL) structures, etc. In FIG. 1, the example data store 124 is an organized collection of data, stored on a computational system that is electronically accessible. For example, the data store 124 may be stored on a server, a desktop computer, an HDD, an SSD, or any other suitable computing system.

Figure 2A:
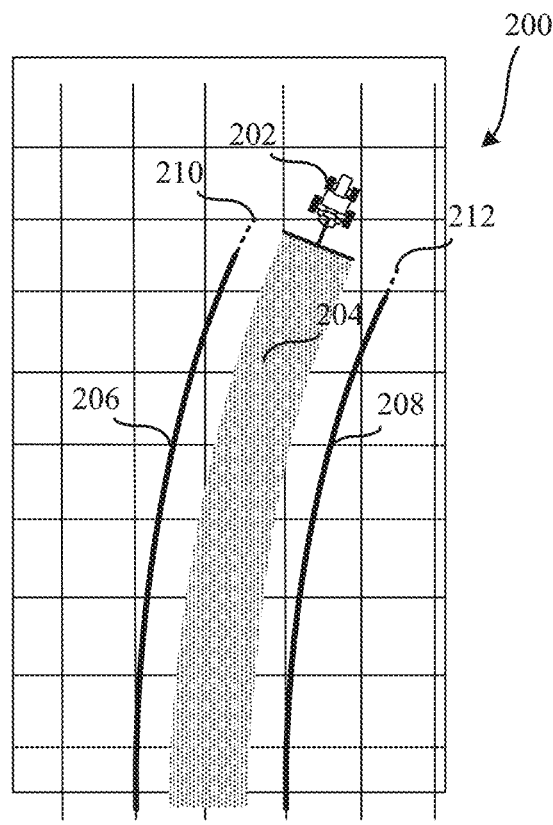
FIG. 2A illustrates an example field with example next pass guidance lines for an example current path.

FIG. 2A illustrates an example field 200 with example next pass guidance lines for an example current path 204. In FIG. 2A, the example field 200 includes an example vehicle 202, the example current path 204, an example guidance line 206, an example guidance line 208, an example next pass guidance line 210, and an example next pass guidance line 212.

In the illustrated example of FIG. 2A, the example field 200 illustrates the generation of the next pass guidance line 210 and the next pass guidance line 212 based on the edge of the current path 204. For example, the example guidance generator 116 of FIG. 1 generates the next pass guidance line 210 and the next pass guidance line 212 based on the edge of the current path 204 and working width of the implement for the vehicle 202. In the illustrated example, the guidance generator 116 communicates with the equipment sensor interface 112 to obtain data corresponding to a velocity of the vehicle 202, a direction of the vehicle 202, etc. In the illustrated example, the guidance generator 116 communicates with the GNSS receiver 114 to obtain the current geographical location of the vehicle 202. In some examples, the guidance generator 116 communicates with the equipment sensor interface 112 and the GNSS receiver 114 as the user operates the vehicle 202 (e.g., in real time) to obtain the data. In examples disclosed herein, the guidance generator 116 determines the edge of the current path 204 of the vehicle 202. In some examples, the guidance generator 116 determines the edge of the current path 204 based on the current geographical location of the vehicle 202 and the working width of the vehicle 202 and/or the working width of an implement. In some examples, the guidance generator 116 obtains the working width of the vehicle 202 from a user input obtained via the user display 106.

In the illustrated example of FIG. 2A, the guidance generator 116 generates the next pass guidance line 210 and the next pass guidance line 212 based on the edge of the current path 204 and based on the guidance line 206 and the guidance line 208 previously generated by the guidance generator 116. In the illustrated example, the guidance generator 116 generates new next pass guidance lines (e.g., the next pass guidance line 210 and the next pass guidance line 212) and updates the previous guidance lines (e.g., the guidance line 206 and the guidance line 208) periodically as a user operates the vehicle 202. For example, the guidance generator 116 generates new next pass guidance lines (e.g., the next pass guidance line 210 and the next pass guidance line 212) and updates the previous guidance lines (e.g., the guidance line 206 and the guidance line 208) every 30 seconds while the vehicle 202 is operating in the field 200. In some examples, after the period timeframe (e.g., after 30 seconds), the guidance generator 116 add the next pass guidance lines (e.g., the next pass guidance line 210 and the next pass guidance line 212) to the previous guidance lines (e.g., the guidance line 206 and the guidance line 208) before generating new next pass guidance lines.

Figure 2B:
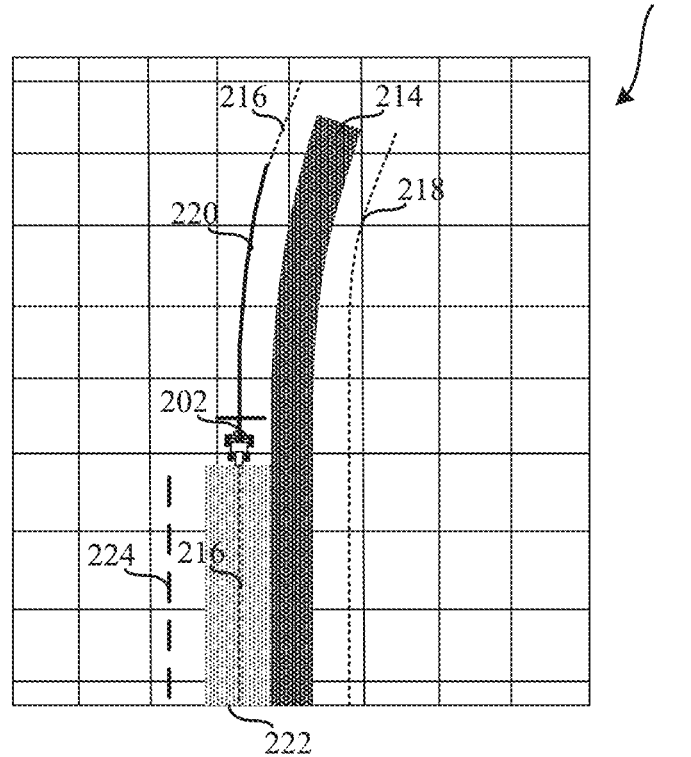
FIG. 2B illustrates an example field with example guidance lines for a following vehicle on an example current path.

FIG. 2B illustrates the example field 200 with example next pass guidance line 210 for a following vehicle on an example current follower path 222. In FIG. 2B, the example field 200 includes the example vehicle 202, an example leading path 214, an example leading guidance line 216, an example leading guidance line 218, an example previous follower path 220, an example current follower path 222, and an example next pass guidance line 224.

FIG. 2B illustrates generating guidance lines (e.g., the next pass guidance line 224) for a following vehicle (e.g., vehicle 202) based on a path from a leading vehicle in the field 200 (e.g., the leading path 214) and the working width of the following vehicle. For example, the guidance generator 116 of FIG. 1 generates the next pass guidance line 224 for the vehicle 202 based on the leading path 214, the leading guidance line 216, the leading guidance line 218, the previous follower path 220, and the current follower path 222. In the illustrated example, the guidance generator 116 communicates with the equipment sensor interface 112 to obtain data corresponding to a velocity of the vehicle 202, a direction of the vehicle 202, etc. In the illustrated example, the guidance generator 116 communicates with the GNSS receiver 114 to obtain the current geographical location of the vehicle 202.

In examples disclosed herein, the guidance generator 116 determines if geographic location data for other vehicles are available. For example, the guidance generator 116 communicates with the GNSS receiver 114 to receive any geographical location data from other vehicles in a shared coverage network. In some examples, the GNSS receiver 114 receives geographical location data from other vehicles in the field 200 (e.g., vehicles different from the example vehicle 102). For example, the GNSS receiver 114 may connect to a shared network for the field 200, and the shared network may obtain coverage data and path data from other machines/vehicles in the network (e.g., the leading path 214, the leading guidance line 216, the leading guidance line 218, etc.). In some examples, the vehicle 202 may be a follower vehicle to a leading vehicle (e.g., a different vehicle in the same field).

In examples disclosed herein, the guidance generator 116 communicates with the equipment sensor interface 112 and the GNSS receiver 114 as the user operates the vehicle 202 (e.g., in real time) to obtain the data. In examples disclosed herein, the guidance generator 116 determines the edge of the current follower path 222 of the vehicle 202. In some examples, the guidance generator 116 determines the edge of the current follower path 222 based on the current geographical location of the vehicle 202 and the working width of the vehicle 202 and/or the working width of an implement. In some examples, the guidance generator 116 obtains the working width of the vehicle 202 from a user input obtained via the user display 106. The guidance generator 116 determines the edge of the leading path 214 based on the geographical location data from the GNSS receiver 114.

In the illustrated example of FIG. 2B, the guidance generator 116 generates the next pass guidance line 224 based on the leading path 214, the leading guidance line 216, the leading guidance line 218, the previous follower path 220, and the current follower path 222. In the illustrated example, the current follower path 222 is based on the leading guidance line 216 from the leading vehicle/machine in the field 200. As seen in FIG. 2B, the vehicle 202 followed the leading guidance line 216 for the previous follower path 220 and for the current follower path 222. In the illustrated example, the guidance generator 116 generates the next pass guidance line 224 using the velocity of the vehicle 202 and the direction of the vehicle 202 data, the edge of the current follower path 222, and the edge of the leading path 214.

Figure 3A:
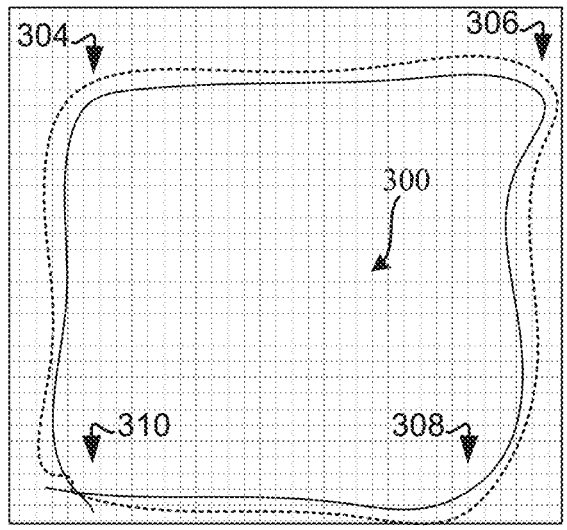
FIGS. 3A-3C illustrate an example field including a field boundary.
Figure 3B:
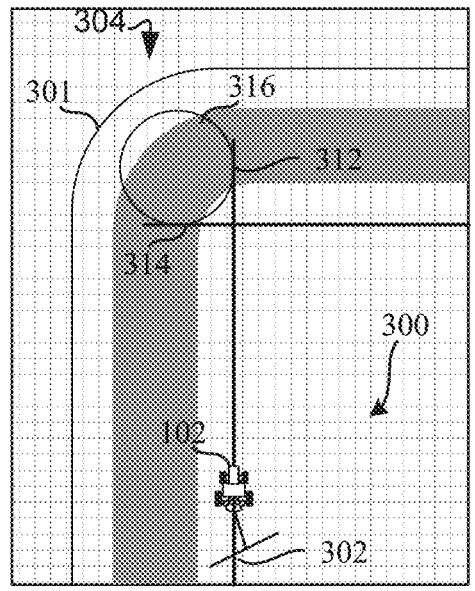
Figure 3C:
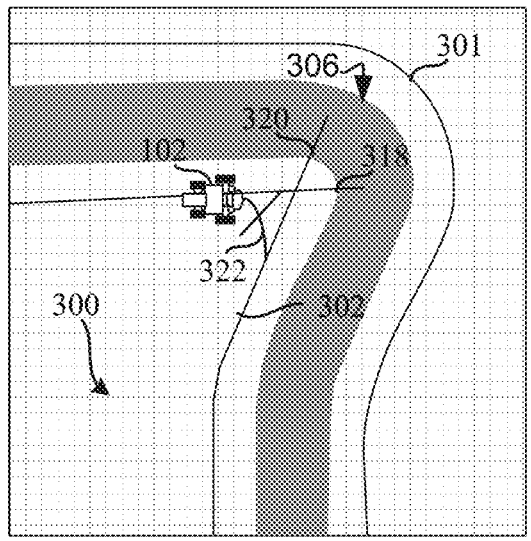

FIGS. 3A-3C illustrate an example field 300 including a field boundary 301. For example, the field boundary 301 may be an example field boundary 301 traced by the vehicle 102 of FIG. 1. In FIG. 3A, the example field boundary 301 includes an example headland path 302, an example first turn 304, an example second turn 306, an example third turn 308, and an example fourth turn 310. While FIG. 3A illustrates the first turn 304, the second turn 306, the third turn 308, and the fourth turn 310, additional turns and/or otherwise position changes may be included in the field boundary 302.

FIG. 3B illustrates the first turn 304 of FIG. 3A. The example of FIG. 3B further illustrates the vehicle 102, the field boundary 301, the example headland path 302, an example first extension coverage path 312, an example second extension coverage path 314, and an example adjusted turn coverage path 316 (e.g., an adjusted turn path). For example, the plan generator 120 of FIG. 1 may, responsive to obtaining an indication that the first turn 304 includes a turn radius less than a radius threshold, generate the adjusted turn coverage path 316 by (a) generating the first extension coverage path 312, (b) generating the second extension coverage path 314, and (c) generating the adjusted turn coverage path 316 based on the first extension coverage path 312 and the second extension coverage path 314. In examples disclosed herein, the adjusted turn coverage path 316 may be a first example adjusted coverage path generated by the plan generator 120.

FIG. 3C illustrates the second turn 306 of FIG. 3A. The example of FIG. 3C further illustrates the vehicle 102, the field boundary 301, the example headland path 302, an example first extension coverage path 318, an example second extension coverage path 320, and an example adjusted turn coverage path 322. For example, the plan generator 120 of FIG. 1 may, responsive to obtaining an indication that the second turn 306 includes a turn radius less than a radius threshold, generate the adjusted turn coverage path 322 by (a) generating the first extension coverage path 318, (b) generating the second extension coverage path 320, and (c) generating the adjusted turn coverage path 322 based on the first extension coverage path 318 and the second extension coverage path 320. In examples disclosed herein, the adjusted turn coverage path 322 may be a second example adjusted path generated by the plan generator 120.

Figure 4A:
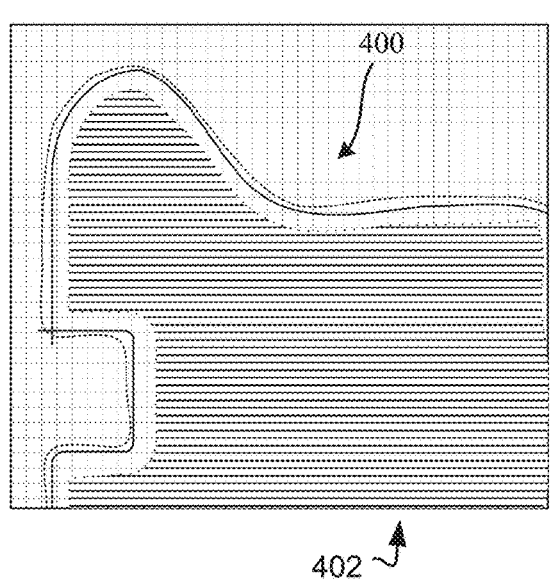
FIG. 4A illustrates an example field and an example path plan.
Figure 4B:
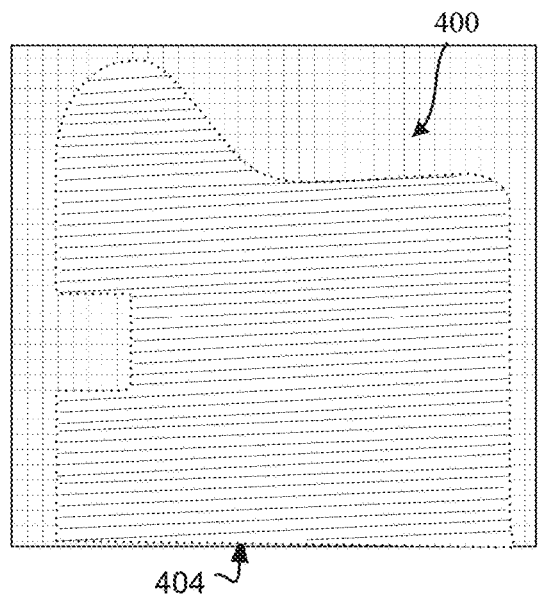
FIG. 4B illustrates an example field and an alternate example path plan.

FIG. 4A illustrates an example field 400 and an example path plan 402. FIG. 4B illustrates the example field 400 and an alternate example path plan 404. In some examples, the field 400 can be an alternative example of the example field 300 of FIG. 3. In FIG. 4A, the path plan 402 includes a series of coverage paths that correspond to an example path plan (e.g., the path plan 126 of FIG. 1) generated by the plan generator 120 of FIG. 1. More specifically, the path plan 402 of FIG. 4A corresponds to an example path plan generated using a first example degree heading (e.g., zero degrees). In FIG. 4B, the path plan 404 corresponds to another example path plan generated by the plan generator 120 of FIG. 1.

More specifically, the path plan 404 of FIG. 4B corresponds to an example path plan generated using a second example degree heading (e.g., five degrees). In some examples, the plan generator 120 of FIG. 1 may generate an alternate and/or otherwise different path plan (e.g., path plan 404) based on a different degree heading. In the illustrated example of FIG. 4B, the plan generator 120 increments the degree heading of path plan 402 of FIG. 4A by five degrees and then generates the path plan 404 based on the new degree heading (e.g., five degrees).

Figure 5:
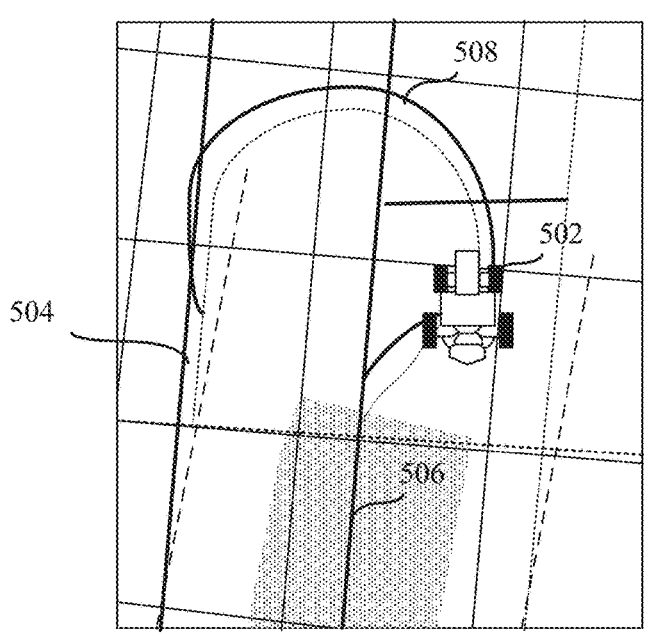
FIG. 5 illustrates an example vehicle, an example first coverage path, an example second coverage path, and an example turn coverage path.

FIG. 5 illustrates an example vehicle 502, an example first coverage path 504, an example second coverage path 506, and an example turn coverage path 508. FIG. 5 illustrates a scenario in which the vehicle 502 and/or a corresponding coupled implement experience slippage while operating. In such an example, the vehicle 502 may be traveling along the first coverage path 504 and, prior to initiating a turn, the vehicle 502 and/or corresponding coupled implement may slip off the first coverage path 504. In such an example, a controller (e.g., the vehicle control network 104 of FIG. 1) is configured to generate the example turn coverage path 508 to guide the vehicle 502 to the second coverage path 506. In examples disclosed herein, the controller (e.g., the vehicle control network 104) may generate the turn coverage path 508 based on current and/or otherwise live positional data.

While an example manner of implementing the vehicle control network 104 of FIG. 1 is illustrated in FIG. 1, one or more of the elements, processes and/or devices illustrated in FIG. 1 may be combined, divided, re-arranged, omitted, eliminated and/or implemented in any other way. Further, the example equipment sensor interface 112, the example GNSS receiver 114, the example turn detector 118, the example plan generator 120, the example controller 122, the example data store 124, and/or, more generally, the example vehicle control network 104 of FIG. 1. may be implemented by hardware, software, firmware and/or any combination of hardware, software and/or firmware. Thus, for example, any of the example equipment sensor interface 112, the example GNSS receiver 114, the example turn detector 118, the example plan generator 120, the example controller 120, the example data store 122, and/or, more generally, the example vehicle control network 104 of FIG. 1. could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example equipment sensor interface 112, the example GNSS receiver 114, the example turn detector 118, the example plan generator 120, the example controller 120, and/or the example data store 122 is/are hereby expressly defined to include a non-transitory computer readable storage device or storage disk such as a memory, a digital versatile disk (DVD), a compact disk (CD), a Blu-ray disk, etc. including the software and/or firmware. Further still, the example vehicle control network 104 of FIG. 1 may include one or more elements, processes and/or devices in addition to, or instead of, those illustrated in FIG. 1 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
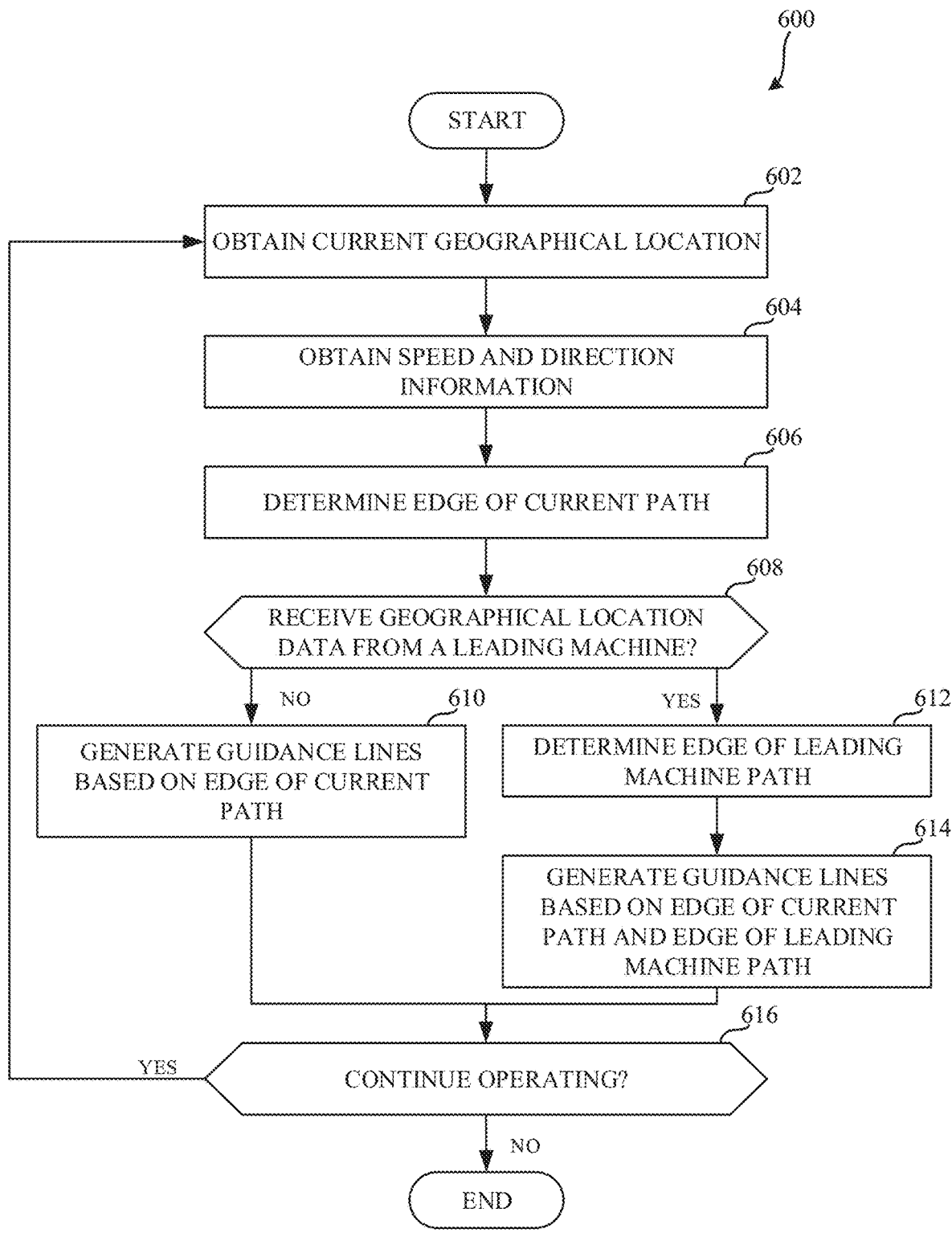
FIG. 6 is a flowchart representative of example machine readable instructions which may be executed to implement the vehicle control network of FIG. 1 to generate guidance lines for a current path.

Flowcharts representative of example hardware logic, machine readable instructions, hardware implemented state machines, and/or any combination thereof for implementing the vehicle control network 104 of FIG. 1 are shown in FIGS. 6 and/or 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and/or 7, many other methods of implementing the example vehicle control network 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6, 7 and/or 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions 600 which may be executed to implement the vehicle control network 104 of FIG. 1 to generate guidance lines for a current path. In some examples, the machine readable instructions 600 may cause a processor to implement the vehicle control network 104 of FIG. 1 to generate guidance lines for a current path.

At block 602, the vehicle control network 104 obtains the current geographical location. (Block 602). In examples disclosed herein, the guidance generator 116 communicates with the GNSS receiver 114 to obtain the current geographical location of the vehicle 102. In some examples, the guidance generator 116 communicates with the GNSS receiver 114 as the user operates the vehicle 102 (e.g., in real time) to obtain data corresponding to a current geographical location of the vehicle 102.

At block 604, the vehicle control network 104 obtains the speed and direction information. (Block 604). In examples disclosed herein, the guidance generator 116 communicates with the equipment sensor interface 112 to obtain data corresponding to a velocity of the vehicle 102, a direction of the vehicle 102, etc. In some examples, the guidance generator 116 communicates with the equipment sensor interface 112 as the user operates the vehicle 102 (e.g., in real time) to obtain data corresponding to a velocity of the vehicle 102, a direction of the vehicle 102, etc.

At block 606, the vehicle control network 104 determines the edge of the current path. (Block 606). In examples disclosed herein, the guidance generator 116 determines the edge of the current path of the vehicle 102. In some examples, the guidance generator 116 determines the edge of the current path based on the current geographical location of the vehicle 102 and the working width of the vehicle 102 and/or the working width of an implement. In the illustrated example, the guidance generator 116 obtains the working width of the vehicle 102 from a user input obtained via the user display 106.

At block 608, the vehicle control network 104 determines if geographical location data from a leading machine is received. (Block 608). In some examples, the GNSS receiver 114 receives geographical location data from other vehicles in the field (e.g., vehicles different from the example vehicle 102). For example, the GNSS receiver 114 may connect to a shared network for the field that the vehicle 102 is operating in, and the shared network may obtain coverage data and path data from other machines in the network. In the event the GNSS receiver 114 determines geographical location data from a leading machine is not received (e.g., the control of block 608 returns a result of NO), the vehicle control network 104 generates guidance lines based on the edge of current path. (Block 610).

Alternatively, in the event the GNSS receiver 114 determines geographical location data from a leading machine is not received (e.g., the control of block 608 returns a result of YES), the vehicle control network 104 determines the edge of the leading machine path. (Block 612). In examples disclosed herein, the guidance generator 116 determines the edge of the leading machine path. In some examples, the guidance generator 116 determines the edge of the leading machine path based on the geographical location data from the leading machine received by the GNSS receiver 114. In some examples, the geographical location data for the leading machine may include geographical location data for the leading machine path (e.g., where the leading machine was located when following the leading machine path). In some examples, the guidance generator 116 determines the edge of the leading machine path based on the geographical location data for the leading machine.

At block 614, the vehicle control network 104 generates the guidance lines based on the edge of the current path and the edge of the leading machine path. (Block 614). In examples disclosed herein, the guidance generator 116 generates guidance lines for the vehicle 102 on a current path based on the data corresponding to the velocity of the vehicle 102, the direction of the vehicle 102, the current geographical location of the vehicle 102, the edge of the current path, the edge of the leading machine path for the other vehicle.

At block 616, the vehicle control network 104 is configured to determine whether to continue operating. (Block 616). In the event the vehicle control network 104 determines to continue operating (e.g., the control of block 616 returns a result of YES), the process returns to block 602. Alternatively, in the event the vehicle control network 104 determines not to continue operating (e.g., the control of block 616 returns a result of NO), the process stops. In examples disclosed herein, the vehicle control network 104 may determine to continue operating in the event a new current geographical location is obtained. Alternatively, in examples disclosed herein, the vehicle control network 104 may determine not to continue operating in the event a loss of power occurs, no further guidance is requested, etc.

Figure 7:
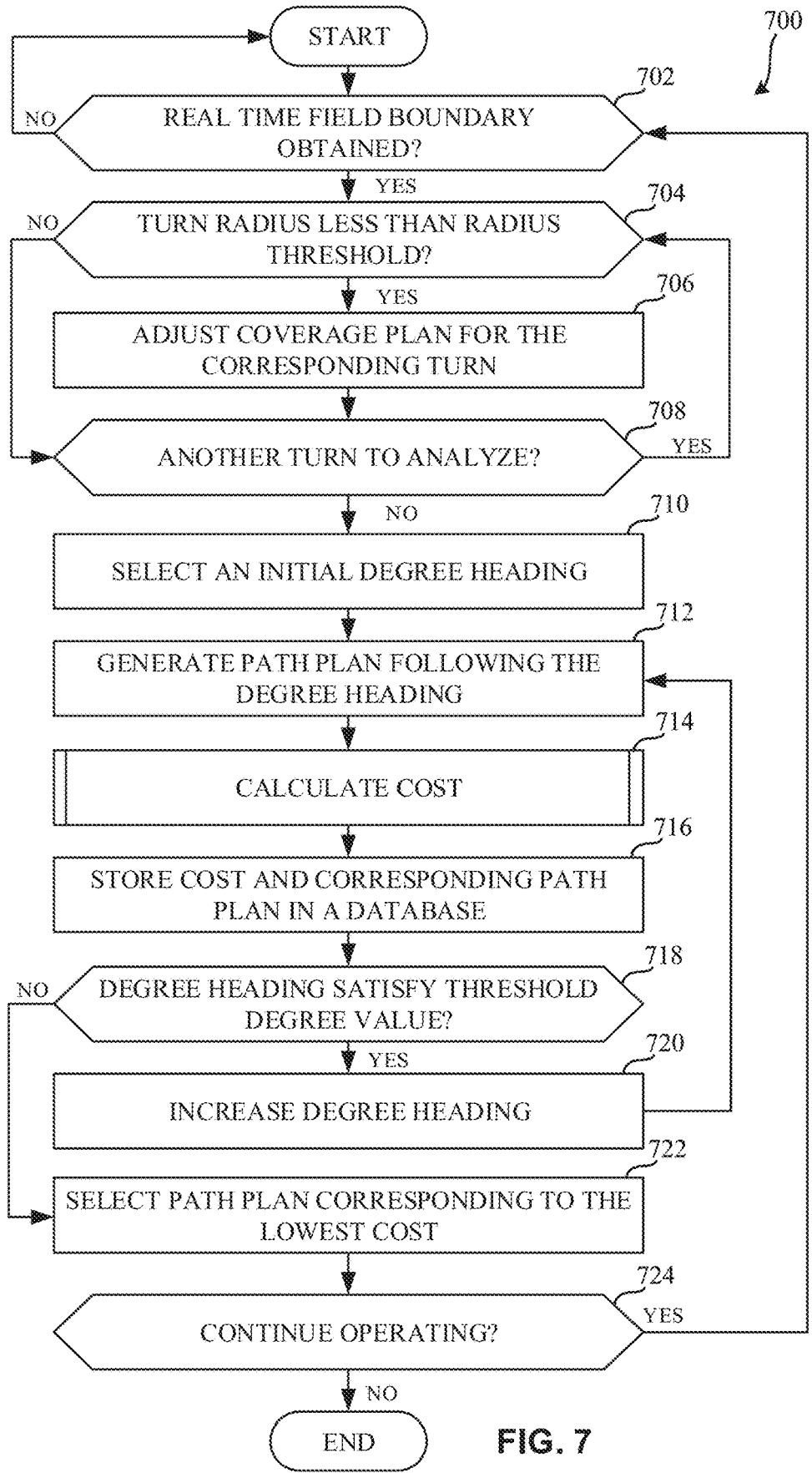
FIG. 7 is a flowchart representative of example machine readable instructions which may be executed to implement the vehicle control network of FIG. 1 to generate the path plan of FIG. 1.

FIG. 7 is a flowchart representative of example machine readable instructions 700 which may be executed to implement the vehicle control network 104 of FIG. 1 to generate the path plan 126 of FIG. 1. In some examples, the machine readable instructions 700 may cause a processor to implement the vehicle control network 104 of FIG. 1 to generate the path plan 126.

At block 702, the vehicle control network 104 is configured to determine whether a real time field boundary is obtained. (Block 702). In examples disclosed herein, the turn detector 118 communicates with the user display 106 to determine whether a user of the vehicle 102 has completed an outline of a boundary of the working field (e.g., a field boundary). In some examples, the turn detector 118 communicates with the user display 106 as the user of the vehicle 102 completes the field boundary (e.g., in real time). In the event the turn detector 118 determines a real time field boundary is not obtained (e.g., the control of block 702 returns a result of NO), the process waits.

Alternatively, in the event the turn detector 118 determines that a real time field boundary is obtained (e.g., the control of block 702 returns a result of YES), the vehicle control network 104 determines whether a turn radius of a turn is less than a radius threshold. (Block 704). In examples disclosed herein, the turn detector 118 is configured to, responsive to determining a real time field boundary is obtained, determine whether a turn within the headland path includes a turn radius less than a radius threshold. For example, the headland path may include four turns and, as such, the turn detector 118 may determine a turn radius of each of the four turns. In this manner, the turn detector 118 compares each turn radius with a radius threshold. In some examples, the radius threshold may be a predetermined value such as, for example, a minimum turn radius of the vehicle 102 and/or any coupled implements. In the event the turn detector 118 determines a turn within the headland path includes a turn radius less than a radius threshold (e.g., the control of block 704 returns a result of YES), the vehicle control network 104 adjusts the coverage plan for the corresponding turn. (Block 706). In examples disclosed herein, the plan generator 120 of FIG. 1 adjusts the path plan for the corresponding turn by generating a coverage path that extends beyond the headland path while remaining within the field boundary so that the vehicle 102 can travel additional space to complete the turn.

In the event the turn detector 118 determines a turn within the headland path does not include a turn radius less than a radius threshold (e.g., the control of block 704 returns a result of YES), or in response to the execution of the instructions represented by block 706, the vehicle control network determines whether there is another turn to analyze. (Block 708). In examples disclosed herein, the turn detector 118 determines whether there is another turn to analyze. In the event the turn detector 118 determines there is another turn to analyze (e.g., the control of block 708 returns a result of YES), the process returns to block 704.

Alternatively, in the event the turn detector 118 determines there is not another turn to analyze (e.g., the control of block 708 returns a result of NO), the vehicle control network 104 selects an initial degree heading. (Block 710). In examples disclosed herein, the plan generator 120 is configured to select an initial degree heading for the example coverage path of the path plan (e.g., the path plan 126) within the field boundary.

At block 712, the vehicle control network 104 generates a path plan following the degree heading. (Block 712). In examples disclosed herein, the plan generator 120 generates a path plan (e.g., the path plan 126) following the degree heading.

At block 714, the vehicle control network 104 calculates the cost. (Block 714). In examples disclosed herein, the plan generator 120 calculates the cost of the path plan 126. Additional description of the instructions represented by block 714 is provided below.

At block 716, the vehicle control network 104 stores the cost and corresponding path plan (e.g., the path plan 126) in a database (e.g., the data store 124). (Block 716). In examples disclosed herein, the plan generator 120 is configured to store the cost and corresponding path plan (e.g., the path plan 126) in the data store 124.

At block 718, the vehicle control network 104 determines whether the degree heading satisfies a threshold degree value. (Block 718). In examples disclosed herein, the plan generator 120 determines whether the degree heading satisfies the threshold degree value. For example, the plan generator 120 may determine that the degree heading satisfies the threshold degree value when the degree heading is less than the threshold degree value. In some examples, the threshold degree value may be a predetermined value such as 180 degrees, 120 degrees, 5 degrees, etc. In the event the plan generator 120 determines the degree heading satisfies the threshold degree value (e.g., the control of block 718 returns a result of YES), the vehicle control network 104 increments the degree heading. (Block 720). For example, the plan generator 120 may have a degree heading of zero degrees, and the plan generator 120 increments this degree heading by a predetermined amount (e.g., five degrees, a half of a degree, a tenth of a degree, etc.). In response to the execution of the instructions represented in block 720, control returns to block 712. For example, the plan generator 120 may increment the degree heading by five degrees and then generate a new path plan based on the new degree heading.

Alternatively, in the event the plan generator 120 determines the degree heading does not satisfy the threshold degree value (e.g., the control of block 718 returns a result of NO), the vehicle control network 104 selects the path plan (e.g., the path plan 126) corresponding to the lowest cost. (Block 722). In examples disclosed herein, the degree heading may not satisfy the threshold degree value when the degree heading is, for example, equal to the threshold degree value or greater than the threshold degree value. In examples disclosed herein, the controller 122 is configured to select the path plan corresponding to the lowest cost.

At block 724, the vehicle control network 104 is configured to determine whether to continue operating. (Block 724). In the event the vehicle control network 104 determines to continue operating (e.g., the control of block 724 returns a result of YES), the process returns to block 702. Alternatively, in the event the vehicle control network 104 determines not to continue operating (e.g., the control of block 724 returns a result of NO), the process stops. In examples disclosed herein, the vehicle control network 104 may determine to continue operating in the event an additional field boundary is obtained. Alternatively, in examples disclosed herein, the vehicle control network 104 may determine not to continue operating in the event a loss of power occurs, no further path planning is requested, etc.

Figure 8:
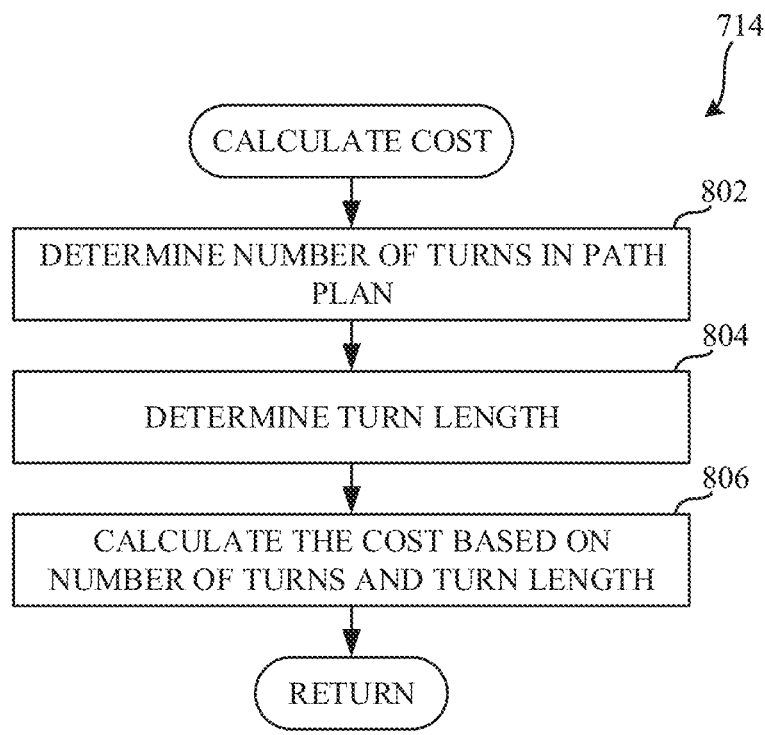
FIG. 8 is a flowchart representative of example machine readable instructions which may be executed to implement the vehicle control network of FIG. 1 to calculate a cost of the path plan of FIG. 1.

FIG. 8 is a flowchart representative of example machine readable instructions 714 which may be executed to implement the vehicle control network 104 of FIG. 1 to calculate a cost of the path plan 126 of FIG. 1. In some examples, the machine readable instructions 714 may cause a processor to implement the vehicle control network 104 of FIG. 1 to calculate a cost of the path plan 126.

At block 802 the vehicle control network 104 determines a number of turns in the path plan. (Block 802). In examples disclosed herein, the plan generator 120 (FIG. 1) determines a number of turns in the path plan 126.

At block 804, the vehicle control network 104 determines the turn length. (Block 804). In examples disclosed herein, the plan generator 120 determines the length of the turn (e.g., distance covered by the turn).

At block 806, the vehicle control network 104 calculates the cost based on the number of turns and the turn length. (Block 806). In examples disclosed herein, the plan generator 120 calculates the cost based on the number of turns and the turn length. For example, the plan generator 120 may execute instructions corresponding to equation 1 above.

Figure 9:
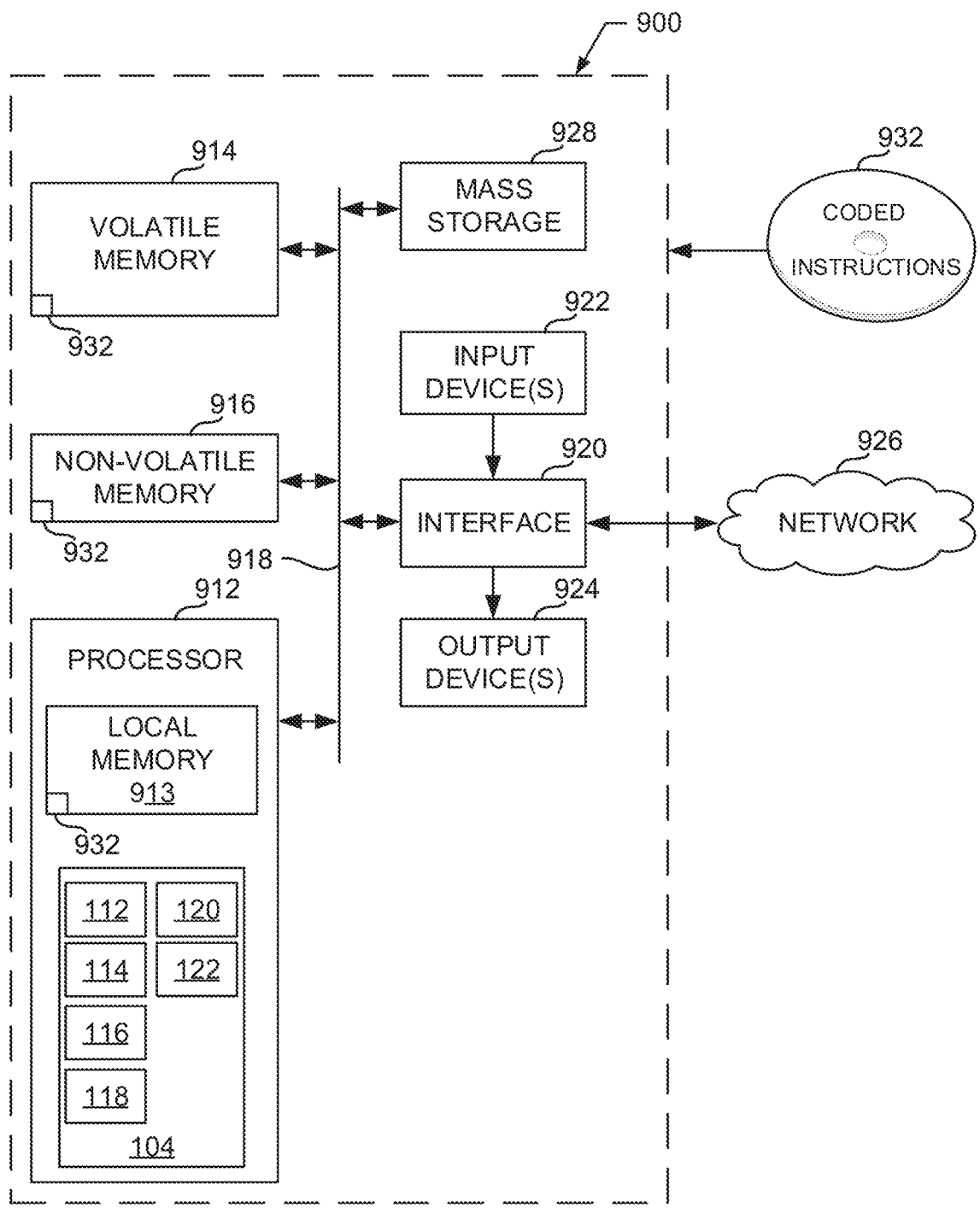
FIG. 9 is a block diagram of an example processor platform structured to execute the instructions of FIGS. 6, 7 and/or 8 to implement the vehicle control network of FIG. 1.

FIG. 9 is a block diagram of an example processor platform 900 structured to execute the instructions of FIGS. 6, 7 and/or 8 to implement the vehicle control network 104 of FIG. 1. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example equipment sensor interface 112, the example GNSS receiver 114, the example turn detector 118, the example plan generator 120, the example controller 122, the example data store 124, and/or, more generally, the example vehicle control network 104 of FIG. 1.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 6, 7 and/or 8 may be stored in the mass storage device 928, in the volatile memory 914, in the non-volatile memory 916, and/or on a removable non-transitory computer readable storage medium such as a CD or DVD.

Figure 10:
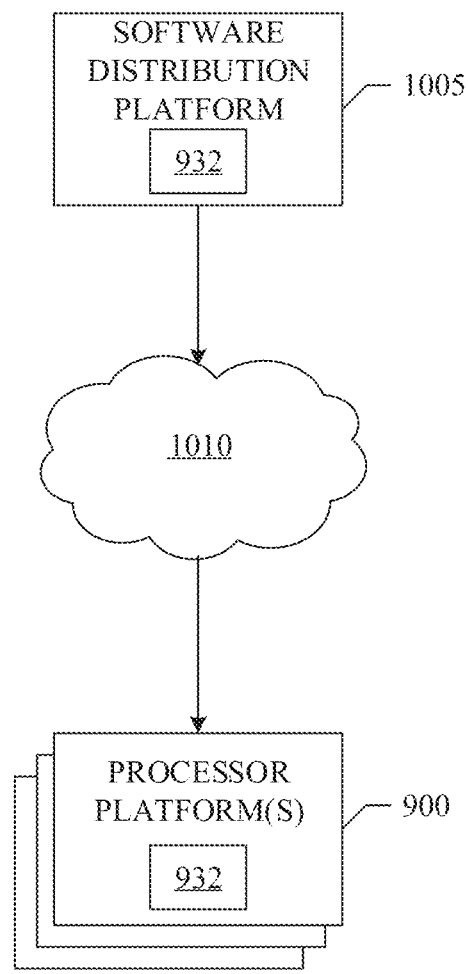
FIG. 10 is a block diagram of an example software distribution platform to distribute software (e.g., software corresponding to the example computer readable instructions of FIGS. 6, 7 and/or 8 to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1005 to distribute software such as the example computer readable instructions 932 of FIG. 9 to third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 932 of FIG. 9. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the computer readable instructions 932, which may correspond to the example computer readable instructions 600 of FIG. 6 and/or the example computer readable instructions 700 of FIGS. 7 and/or 8, as described above. The one or more servers of the example software distribution platform 1005 are in communication with a network 1010, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 932 from the software distribution platform 1005. For example, the software, which may correspond to the example computer readable instructions 600 of FIG. 6 and/or the example computer readable instructions 700 of FIGS. 7 and/or 8, may be downloaded to the example processor platform 900, which is to execute the computer readable instructions 932 to implement the vehicle control network 104 of FIG. 1. In some example, one or more servers of the software distribution platform 1005 periodically offer, transmit, and/or force updates to the software (e.g., the example computer readable instructions 932 of FIG. 9) to ensure improvements, patches, updates, etc. are distributed and applied to the software at the end user devices.

From the foregoing, it will be appreciated that example methods, apparatus and articles of manufacture have been disclosed that generate a path plan using data obtained in substantially real time. The disclosed methods, apparatus and articles of manufacture improve the efficiency of using a computing device by utilizing data obtained in substantially real time to generate a path plan for a vehicle. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine-readable instructions in the apparatus; and
   processor circuitry to at least one of execute or instantiate the machine-readable instructions to at least:
      generate a headland path having a first path portion, a second path portion, and an adjusted turn path connecting the first path portion to the second path portion, wherein an area between the headland path and a field boundary defines an untended portion of a field, and wherein the headland path further defines a tended portion of the field, the adjusted turn path determined based on a first extension coverage path and a second extension coverage path, the first extension coverage path being an extension of the first path portion into the untended portion, the second extension coverage path being an extension of the second path portion into the untended portion;
      generate a first path plan for the tended portion, the first path plan including first coverage paths, the first coverage paths generated using a first degree heading;
      generate a second path plan for the tended portion, the second path plan including second coverage paths, the second coverage paths generated using a second degree heading;
      determine a first cost of the first path plan and a second cost of the second path plan, the first cost and the second cost based on a number of turns and a turn length;
      select one of the first path plan or the second path plan based on a comparison of the first cost to the second cost; and
      cause a vehicle to traverse the field based on the one of the first path plan or the second path plan.

2. The apparatus of claim 1, wherein the processor circuitry is to receive geographical location data from a receiver, the geographical location data including the geographical location data of the vehicle and geographical location data of at least one leading vehicle, the geographical location data of the at least one leading vehicle including a leading path followed by the at least one leading vehicle.

3. The apparatus of claim 2, wherein the processor circuitry is to generate guidance lines for a current path based on an edge of the leading path.

4. The apparatus of claim 1, wherein the processor circuitry is to generate the first cost based on first turns included in the first path plan and the second cost based on second turns included in the second path plan.

5. The apparatus of claim 4, wherein the processor circuitry is to:
   determine a number of the first turns in the first path plan;
   determine a turn length of the first path plan; and
   calculate the first cost based on the number of the first turns and the turn length.

6. The apparatus of claim 1, wherein the processor circuitry is to:
   determine a turn in the field boundary; and
   determine whether a turn radius of the turn satisfies a radius threshold.

7. The apparatus of claim 6, wherein the processor circuitry is to generate an adjusted turn path when the turn radius does not satisfy the radius threshold.

8. A non-transitory computer readable medium comprising instructions which, when executed, cause at least one processor to:
   generate a headland path having a first path portion, a second path portion, and an adjusted turn path connecting the first path portion to the second path portion, wherein an area between the headland path and a field boundary defines an untended portion of a field, and wherein the headland path further defines a tended portion of the field, the adjusted turn path determined based on a first extension coverage path and a second extension coverage path, the first extension coverage path being an extension of the first path portion into the untended portion, the second extension coverage path being an extension of the second path portion into the untended portion;
   generate a first path plan for the tended portion, the first path plan including first coverage paths, the first coverage paths generated using a first degree heading;
   generate a second path plan for the tended portion, the second path plan including second coverage paths, the second coverage paths generated using a second degree heading;
   determine a first cost of the first path plan and a second cost of the second path plan, the first cost and the second cost based on a number of turns and a turn length;
   select one of the first path plan or the second path plan based on a comparison of the first cost to the second cost; and
   cause a vehicle to traverse the field based on the one of the first path plan or the second path plan.

9. The non-transitory computer readable medium of claim 8, wherein the instructions, when executed, cause the at least one processor to:
   receive geographical location data from a receiver, the geographical location data including the geographical location data of the vehicle and geographical location data of at least one leading vehicle, the geographical location data of the at least one leading vehicle including a leading path followed by the at least one leading vehicle; and
   generate guidance lines for a current path based on an edge of the current path and an edge of the leading path.

10. The non-transitory computer readable medium of claim 8, wherein the instructions, when executed, cause the at least one processor to generate the first cost based on first turns included in the first path plan and the second cost based on second turns included in the second path plan.

11. The non-transitory computer readable medium of claim 10, wherein the instructions, when executed, cause the at least one processor to generate the first cost by:
   determining a number of the first turns in the first path plan;
   determining a turn length of the first path plan; and
   calculating the first cost based on the number of the first turns and the turn length.

12. The non-transitory computer readable medium of claim 8, wherein the instructions, when executed, cause the at least one processor to:
   determine a turn in the field boundary; and
   determine whether a turn radius of the turn satisfies a radius threshold.

13. The non-transitory computer readable medium of claim 12, wherein the instructions, when executed, cause the at least one processor to generate an adjusted turn path when the turn radius does not satisfy the radius threshold.

14. A method comprising:
generating a headland path having a first path portion, a second path portion, and an adjusted turn path connecting the first path portion to the second path portion, wherein an area between the headland path and a field boundary defines an untended portion of a field, and wherein the headland path further defines a tended portion of the field, the adjusted turn path determined based on a first extension coverage path and a second extension coverage path, the first extension coverage path being an extension of the first path portion into the untended portion, the second extension coverage path being an extension of the second path portion into the untended portion;
generating a first path plan for the tended portion, the first path plan including first coverage paths, the first coverage paths generated using a first degree heading;
generating a second path plan for the tended portion, the second path plan including second coverage paths, the second coverage paths generated using a second degree heading;
determining a first cost of the first path plan and a second cost of the second path plan, the first cost and the second cost based on a number of turns and a turn length;
selecting one of the first path plan or the second path plan based on a comparison of the first cost to the second cost; and
cause a vehicle to traverse the field based on the one of the first path plan or the second path plan.

15. The method of claim 14, further including receiving geographical location data from a receiver, the geographical location data including the geographical location data of the vehicle and geographical location data of at least one leading vehicle, the geographical location data of the at least one leading vehicle including a leading path followed by the at least one leading vehicle.

16. The method of claim 15, further including generating guidance lines for a current path based on an edge of the current path and an edge of the leading path.

17. The method of claim 14, further including generating the first cost based on first turns included in the first path plan and the second cost based on second turns included in the second path plan.

18. The method of claim 17, further including generating the first cost by:
determining a number of the first turns in the first path plan;
determining a turn length of the first path plan; and
calculating the first cost based on the number of the first turns and the turn length.

19. The method of claim 14, further including:
determining a turn in the field boundary; and
determining whether a turn radius of the turn satisfies a radius threshold.

20. The method of claim 19, further including generating an adjusted turn path when the turn radius does not satisfy the radius threshold.

* * * * *